(12) United States Patent
Yoshii

(10) Patent No.: US 11,115,571 B2
(45) Date of Patent: Sep. 7, 2021

(54) VEHICLE IMAGING UNIT

(71) Applicant: HONDA MOTOR CO., LTD., Tokyo (JP)

(72) Inventor: Yuichi Yoshii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/540,083

(22) Filed: Aug. 14, 2019

(65) Prior Publication Data
US 2020/0076996 A1 Mar. 5, 2020

(30) Foreign Application Priority Data
Aug. 28, 2018 (JP) .............................. JP2018-159709

(51) Int. Cl.
| | |
|---|---|
| *H04N 5/225* | (2006.01) |
| *B60R 11/00* | (2006.01) |
| *B60R 11/04* | (2006.01) |
| *B60R 1/00* | (2006.01) |

(52) U.S. Cl.
CPC ......... *H04N 5/2253* (2013.01); *H04N 5/2254* (2013.01); *B60R 1/00* (2013.01); *B60R 11/04* (2013.01); *B60R 2011/004* (2013.01); *B60R 2300/8046* (2013.01)

(58) Field of Classification Search
CPC ...... H04N 5/2253; H04N 5/2254; B60R 1/00; B60R 11/04; B60R 2011/004; B60R 2300/8046
USPC ....................................................... 348/148
See application file for complete search history.

(56) References Cited

U.S. PATENT DOCUMENTS

| | | | | |
|---|---|---|---|---|
| 4,651,144 A | * | 3/1987 | Pagano | G08B 13/19632 340/541 |
| 6,405,975 B1 | * | 6/2002 | Sankrithi | B64D 47/08 244/1 R |
| 10,040,547 B1 | * | 8/2018 | Pedigo | B64C 29/005 |
| 2012/0298801 A1 | * | 11/2012 | Ellison | B64D 43/02 244/129.1 |
| 2012/0314075 A1 | | 12/2012 | Cho | |
| 2017/0066377 A1 | * | 3/2017 | Okabe | B60R 1/12 |
| 2020/0023774 A1 | * | 1/2020 | Lamorte | B60R 1/076 |

FOREIGN PATENT DOCUMENTS

JP 2013-520363 6/2013

* cited by examiner

*Primary Examiner* — Joseph G Ustaris
*Assistant Examiner* — Matthew David Kim
(74) *Attorney, Agent, or Firm* — Amin, Turocy & Watson, LLP

(57) ABSTRACT

A vehicle imaging unit includes a rearward imaging apparatus and a housing. The rearward imaging apparatus captures an image of a side rear direction of a vehicle. The housing houses the rearward imaging apparatus and is attached to a side part of a vehicle body. An imaging lens of the rearward imaging apparatus is arranged on a rear end part of the housing. A protrusion part that extends substantially in a vehicle front-to-rear direction is provided on a lower surface of the housing.

21 Claims, 13 Drawing Sheets

VEHICLE IMAGING UNIT

CROSS-REFERENCE TO RELATED APPLICATION

Priority is claimed on Japanese Patent Application No. 2018-159709, filed on Aug. 28, 2018, the contents of which are incorporated herein by reference.

BACKGROUND

Field of the Invention

The present invention relates to a vehicle imaging unit that includes an imaging apparatus which captures an image of a side rear direction of a vehicle.

Background

A technique is known in which an imaging unit (camera) having an imaging apparatus that is configured to capture an image of a side rear direction of a vehicle and a monitor that displays the image which is captured by the imaging apparatus are integrated as a monitor unit, and the integrated monitor unit is attached to a triangular window portion of a front part of a front side door (refer to Published Japanese Translation No. 2013-520363 of the PCT International Publication).

In the monitor unit described in Published Japanese Translation No. 2013-520363 of the PCT International Publication, in a state where the monitor unit is attached to the triangular window portion of the front side door, the monitor is arranged in a vehicle room, and the imaging unit is arranged outside the vehicle room. An imaging lens of the imaging unit is provided on a rear surface of a housing such that an optical axis of the imaging lens is directed to the side rear direction of the vehicle.

SUMMARY

In the monitor unit described in Published Japanese Translation No. 2013-520363 of the PCT International Publication, the imaging apparatus is accommodated in the housing of the imaging unit that is arranged outside the vehicle. The imaging lens of the imaging apparatus is provided on a rear end surface of the housing such that the optical axis of the imaging lens is directed to the side rear direction of the vehicle. Therefore, it is desired that the imaging unit has a structure in which water droplet such as rain does not easily come around to an imaging lens part when the vehicle travels.

An aspect of the present invention provides a vehicle imaging unit capable of preventing water droplet such as rain from coming around to an imaging lens part when a vehicle travels.

A vehicle imaging unit according to an aspect of the present invention includes: a rearward imaging apparatus that is configured to capture an image of a side rear direction of a vehicle; and a housing that houses the rearward imaging apparatus and that is attached to a side part of a vehicle body, wherein an imaging lens of the rearward imaging apparatus is arranged on a rear end part of the housing, and a protrusion part that extends substantially in a vehicle front-to-rear direction is provided on a lower surface of the housing.

In the case of the above structure, when the vehicle travels, travel wind that hits on a front surface of the housing is separated into a flow that flows along an upper surface of the housing and a flow that flows along a lower surface of the housing. The flow of the travel wind that flows along the lower surface of the housing is separated at the protrusion part to right and left, and then, the separated flows merge in the vicinity of a rear end of the housing. Specifically, since the protrusion part has a shape that extends substantially in the vehicle front-to-rear direction, the travel wind does not stagnate in the vicinity of the rear end of the housing and flows smoothly to the vehicle body rear direction. Therefore, even when water droplet such as rain flows into the vicinity below the imaging lens of the rearward imaging apparatus, it is possible to smoothly blow the water droplet by the travel wind to the vehicle rearward direction.

The protrusion part may have a shape having a region of which a separation width with respect to a side surface of the vehicle body becomes narrower toward a further rearward direction of the vehicle.

In this case, at the time of the vehicle traveling, when the travel wind flows between the protrusion part and the vehicle body side surface, in the region in which the separation width between the side surface of the vehicle body and the protrusion part becomes narrower, the speed is increased. Therefore, it is possible to further smoothly blow the water droplet that flows into the vicinity below the imaging lens of the rearward imaging apparatus to the vehicle body rearward direction, at an inner position in the vehicle width direction of the imaging lens. Accordingly, when this configuration is employed, it is possible to further prevent the water droplet such as rain from coming around to the imaging lens part when the vehicle travels.

The housing may further house a downward imaging apparatus that captures an image of a side lower direction of the vehicle, and an imaging lens of the downward imaging apparatus may penetrate through a lower surface of the housing and be arranged on the protrusion part.

In this case, by using the imaging lens of the downward imaging apparatus, it is possible to adjust the travel wind on the lower surface side of the housing.

The protrusion part may have a shape having a region that extends in a vehicle rearward direction further than the imaging lens of the downward imaging apparatus.

In this case, the protrusion part continues to the rearward direction side of the imaging lens, and therefore, the imaging lens becomes less noticeable externally, and the design property of the external appearance is enhanced.

The protrusion part may be formed in a substantially spindle shape that is elongated in the vehicle front-to-rear direction.

In this case, at the lower surface of the housing, it is possible to allow the travel wind to flow further smoothly in the vehicle rearward direction by the protrusion part of the substantially spindle shape. Further, when seen externally, the protrusion part becomes less noticeable, and the design property of the external appearance is enhanced.

The protrusion part may be formed in a substantially spindle shape that is elongated in the vehicle front-to-rear direction, and the imaging lens of the downward imaging apparatus may be arranged in a region of the protrusion part having a wider width than that in a vehicle width direction of the imaging lens.

In this case, the imaging lens of the downward imaging apparatus allows the flow of the travel wind at the lower surface of the housing to hardly stagnate. Therefore, even in a structure in which the imaging lens of the downward imaging apparatus is arranged at the lower surface of the housing, it is possible to smoothly blow the water droplet that flows into the vicinity below the imaging lens of the downward imaging apparatus to the vehicle body rearward direction.

The imaging lens of the downward imaging apparatus may be arranged such that a surface shape of the imaging lens substantially continues to a surface shape of the protrusion part.

In this case, the surface shape of the imaging lens of the downward imaging apparatus constitutes part of the substantially spindle shape of the protrusion part. Therefore, even in a structure in which the imaging lens of the downward imaging apparatus is arranged at the lower surface of the housing, it is possible to smoothly blow the water droplet that flows into the vicinity below the imaging lens of the downward imaging apparatus to the vehicle body rearward direction.

The protrusion part may be arranged in a region that overlaps with part of the imaging lens of the downward imaging apparatus in a vehicle width direction.

In this case, since part of the imaging lens of the downward imaging apparatus is arranged in a region in which the travel wind passes through the protrusion part and smoothly flows in the vehicle rearward direction when the vehicle travels, it is possible to smoothly blow the water droplet that flows into the vicinity below the imaging lens of the downward imaging apparatus to the vehicle body rearward direction.

A simulated lens portion having substantially the same shape as that in a case where the imaging lens of the downward imaging apparatus which captures the image of the side lower direction of the vehicle is arranged on the protrusion part may be formed on the protrusion part.

In this case, since the flow of the travel wind when the vehicle travels is substantially the same between a vehicle imaging unit that includes the downward imaging apparatus and a vehicle imaging unit that does not include the downward imaging apparatus, the design of the housing in consideration of the adjustment of the flow of the travel wind becomes easy when producing two types of the vehicle imaging units.

According to an aspect of the present invention, since the protrusion part that extends substantially in the vehicle front-to-rear direction is provided on the lower surface of the housing, when the vehicle travels, it is possible to adjust the flow of the travel wind that flows to the lower surface of the housing by the protrusion part and to smoothly blow the water droplet such as rain that flows into the vicinity below the imaging lens of the rearward imaging apparatus to the vehicle rearward direction. Accordingly, when an aspect of the present invention is employed, it is possible to prevent the water droplet such as rain from coming around to the imaging lens part when the vehicle travels.

DESCRIPTION OF EMBODIMENTS

Figure 1:
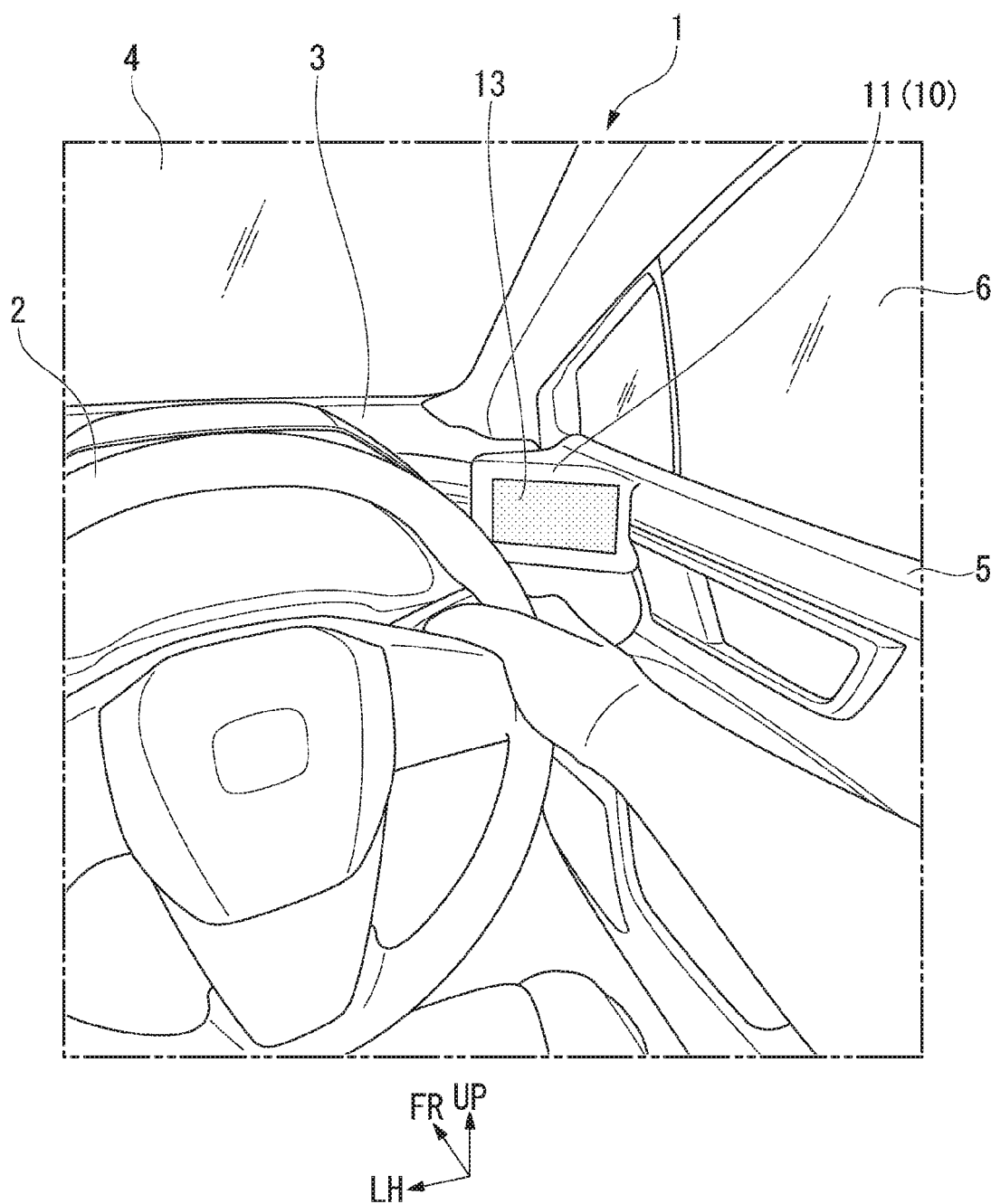
FIG. 1 is a perspective view showing a vehicle room inside of a vehicle according to an embodiment of the present invention.

Hereinafter, embodiments of the present invention will be described with reference to the drawings. In the following description, it is assumed that frontward, rearward, upward, downward, rightward and leftward mean frontward, rearward, upward, downward, rightward, and leftward with respect to a vehicle unless otherwise specified. An arrow UP that indicates an upward direction of the vehicle, an arrow FR that indicates a frontward direction of the vehicle, and an arrow LH that indicates a left side direction of the vehicle are shown at an appropriate position in the drawings. In the embodiments described below, the same part is given by a common reference numeral, and redundant description is omitted.

FIG. 1 is a view showing a vehicle room inside of a vehicle 1 of an embodiment. FIG. 1 is a view of a frontward direction of a front seat (a driver seat and a passenger seat) of the vehicle when seen from an obliquely rearward upward direction.

FIG. 1 shows a steering wheel 2 that is arranged in a frontward direction of the driver seat (not shown), an instrument panel 3, a windshield glass 4 in a vehicle room frontward direction, and a front side door 5 on the driver seat side. A door glass 6 is provided on the front side door 5 to be movable upward and downward. The vehicle 1 of the present embodiment includes a rearward display system 10 that displays, at a vehicle room inside, a side rear direction of the vehicle. The rearward display system 10 captures an image of right and left rear directions of the vehicle using a rearward imaging apparatus 15 (refer to FIG. 7 and the like) and displays the captured image on a monitor 11 inside the vehicle room.

The rearward display system 10 includes the rearward imaging apparatus 15 that is arranged on an outer side of each of right and left front side doors 5, a pair of monitors 11 each of which is provided inside the vehicle room so as to correspond to each of the right and left rearward imaging apparatuses 15, and a control apparatus (not shown) that controls the rearward imaging apparatus 15 and the monitor 11. The monitor 11 that corresponds to each of the right and left rearward imaging apparatuses 15 is provided in the vicinity of a lower end of right and left front pillars 7 inside the vehicle room. A captured image of a leftward rearward direction of the vehicle is displayed on the monitor 11 at the lower end of the left front pillar 7. A captured image of a rightward rearward direction of the vehicle is displayed on the monitor 11 at the lower end of the right front pillar 7.

Figure 2:
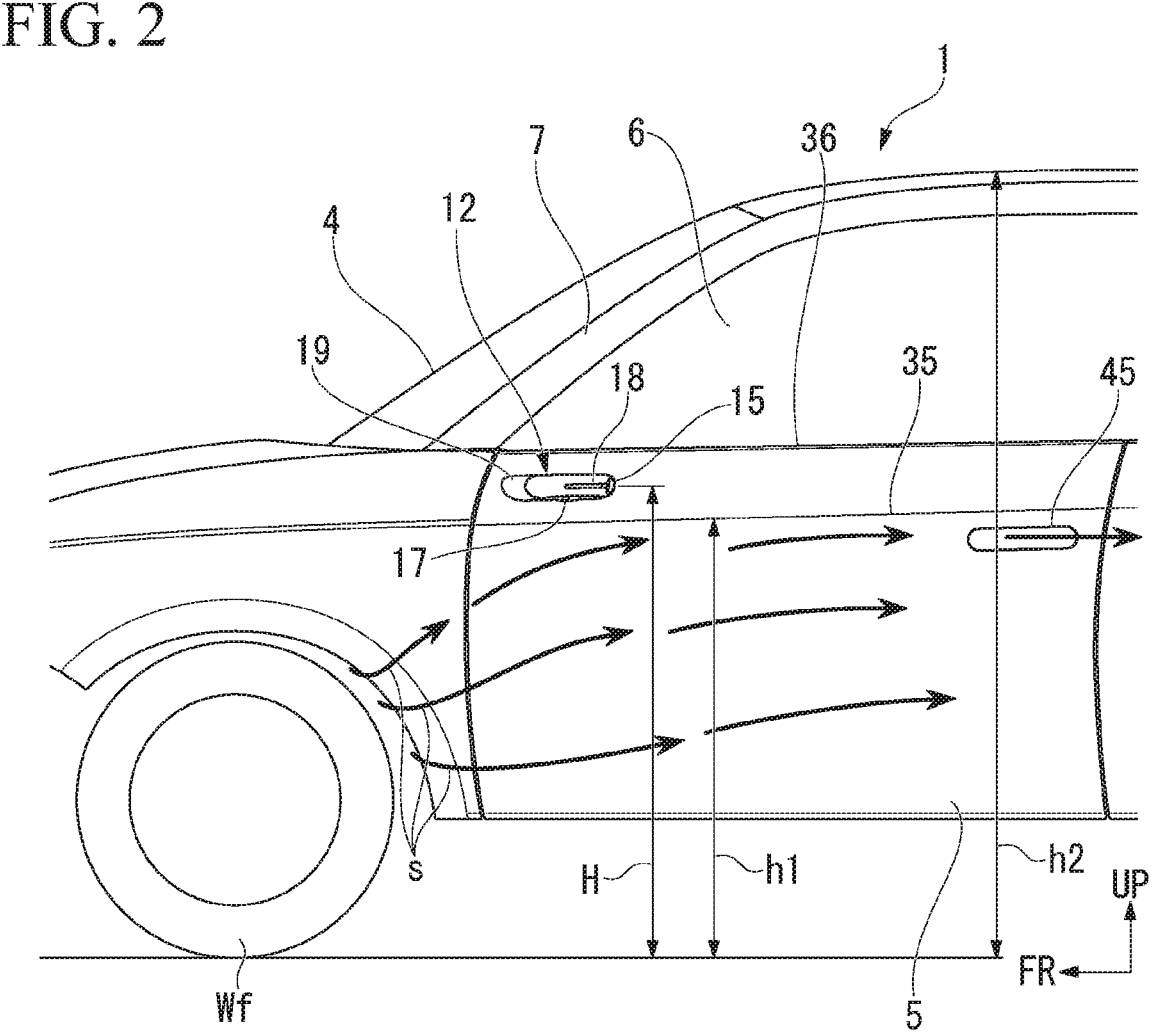
FIG. 2 is a side view of the vehicle according to the embodiment of the present invention.
Figure 3:
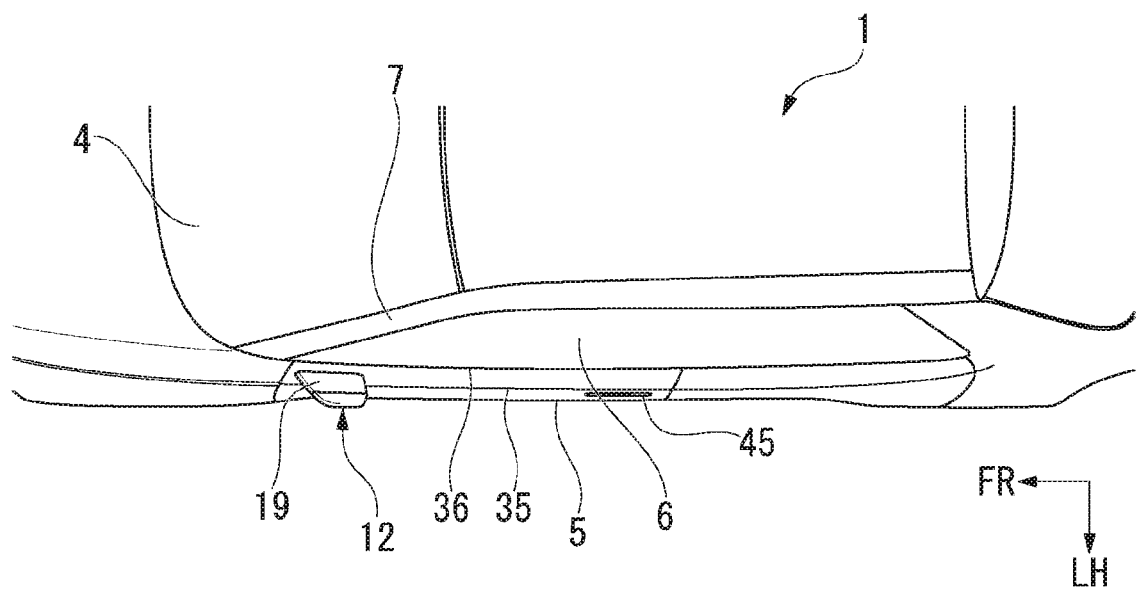
FIG. 3 is a top view of the vehicle according to the embodiment of the present invention.
Figure 4:
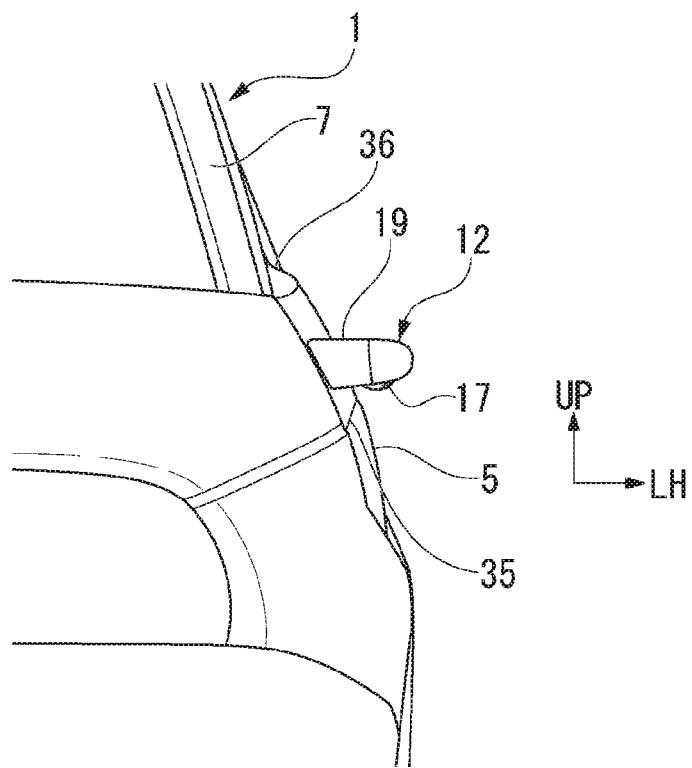
FIG. 4 is a front view of the vehicle according to the embodiment of the present invention.
Figure 5:
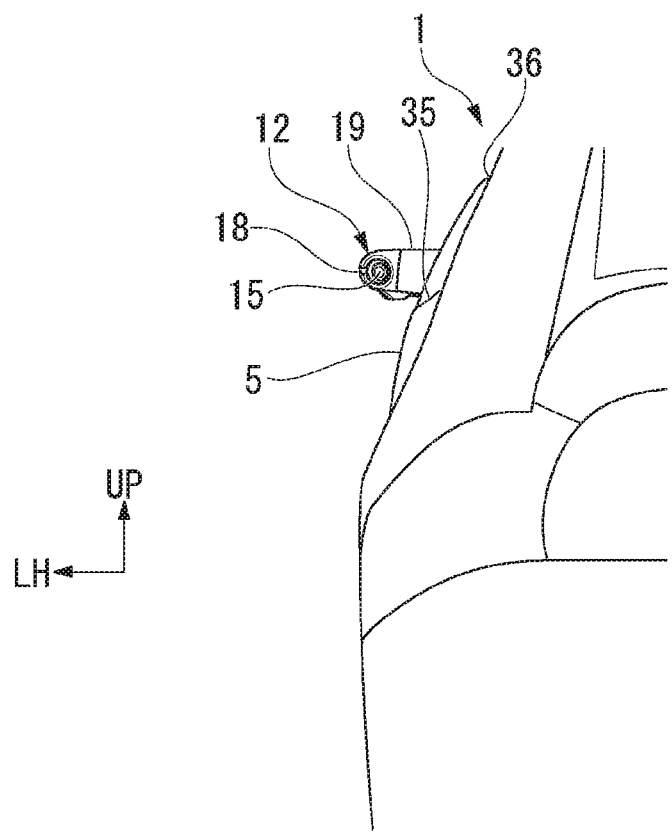
FIG. 5 is a rear view of the vehicle according to the embodiment of the present invention.

FIG. 2 is a view of the vehicle 1 seen from a left side direction. FIG. 3 is a view of a left half region of the vehicle 1 seen from an upward direction. FIG. 4 is a view of the left half region of the vehicle 1 seen from a frontward direction. FIG. 5 is a view of the left half region of the vehicle seen from a rearward direction.

As shown in FIGS. 2 to 5, a vehicle imaging unit 12 (hereinafter, referred to as an "imaging unit 12") that includes the rearward imaging apparatus 15 described above is attached to an outer side surface of the left front side door 5. An imaging unit 12 similar to that on the left side is attached also to an outer side surface of the right front side door 5.

Figure 6:
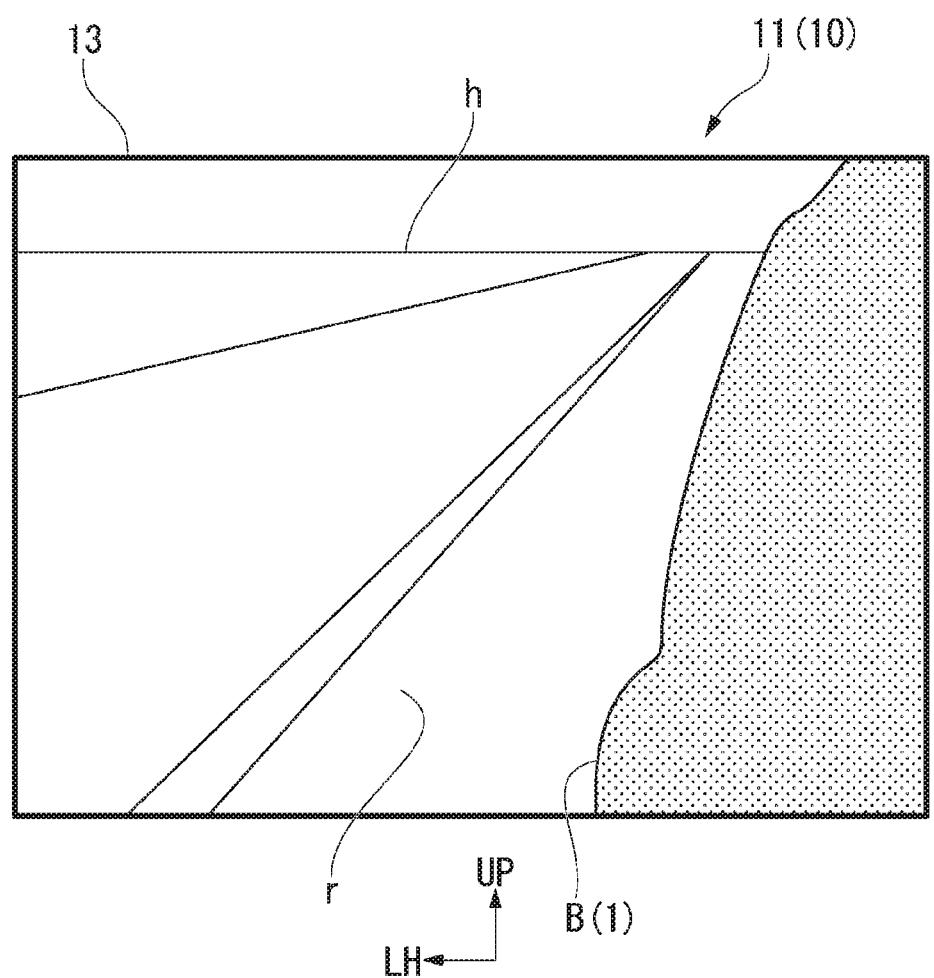
FIG. 6 is a view showing a display of a monitor of a rearward display system according to the embodiment of the present invention.

FIG. 6 is a view showing a display screen 13 of the monitor 11 that is provided inside the vehicle room.

An image of the side rear direction that is captured by the rearward imaging apparatus 15 together with part of a vehicle body B at the side part of the vehicle is displayed on the display screen 13 of the monitor 11. The display screen 13 is set such that when the vehicle 1 travels on a flat road surface, a horizontal line h in the vehicle rearward direction and a road surface r in the rearward direction by a predetermined distance of the vehicle are simultaneously displayed on the display screen 13. An imaging target to be imaged on the display screen 13 is appropriately set by the size of the display screen 13, an arrangement height and a position in the front-to-rear direction of the rearward imaging apparatus 15, a field angle, or the like. The imaged amount of the vehicle on the display screen 13 is set to, for example, 10% or less of the entire display screen 13.

First Embodiment

Figure 7:
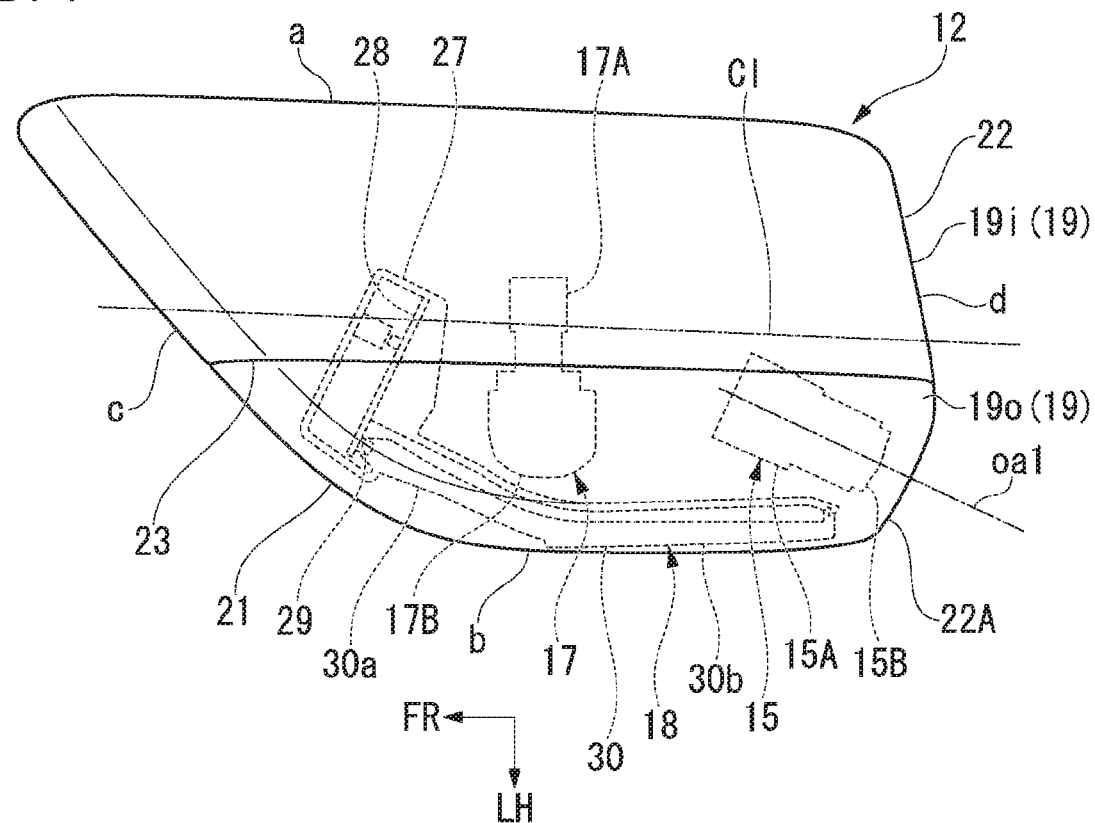
FIG. 7 is a top view of an imaging unit according to a first embodiment of the present invention.
Figure 8:
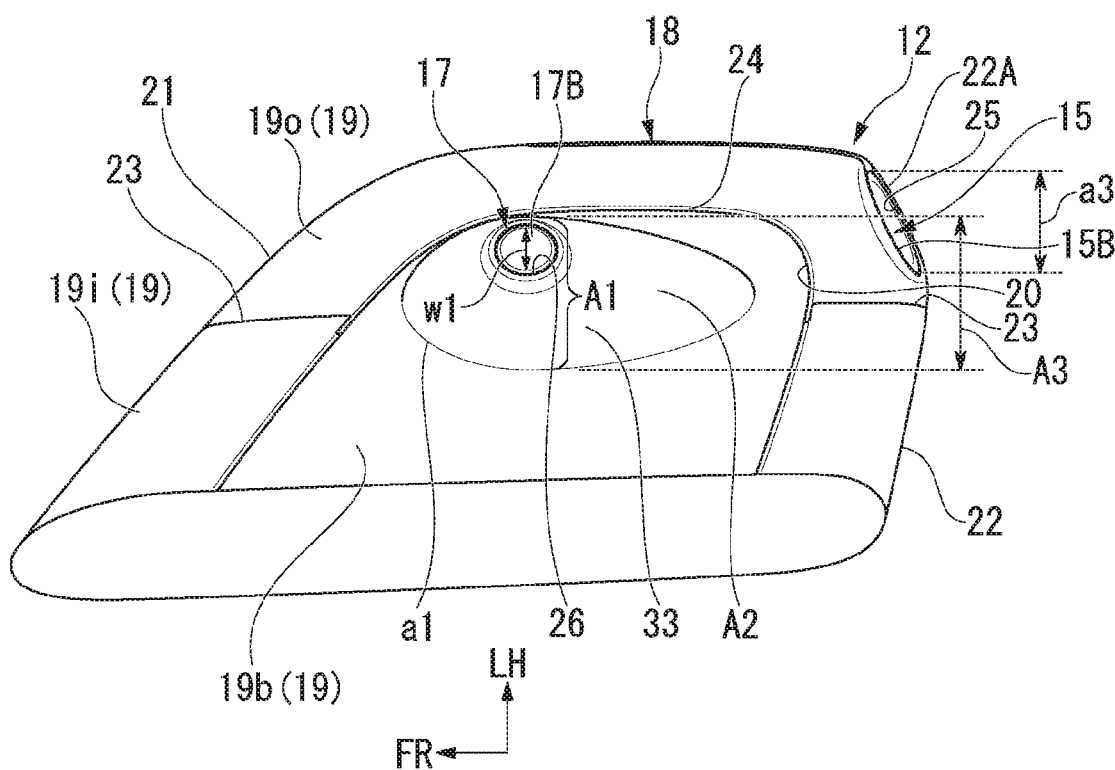
FIG. 8 is a bottom view of the imaging unit according to the first embodiment of the present invention.
Figure 9:
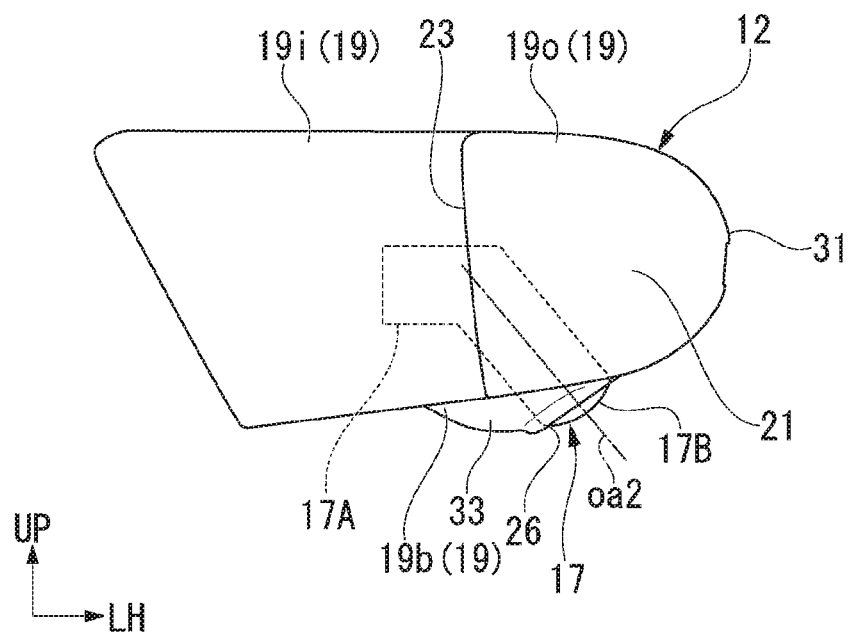
FIG. 9 is a front view of the imaging unit according to the first embodiment of the present invention.
Figure 10:
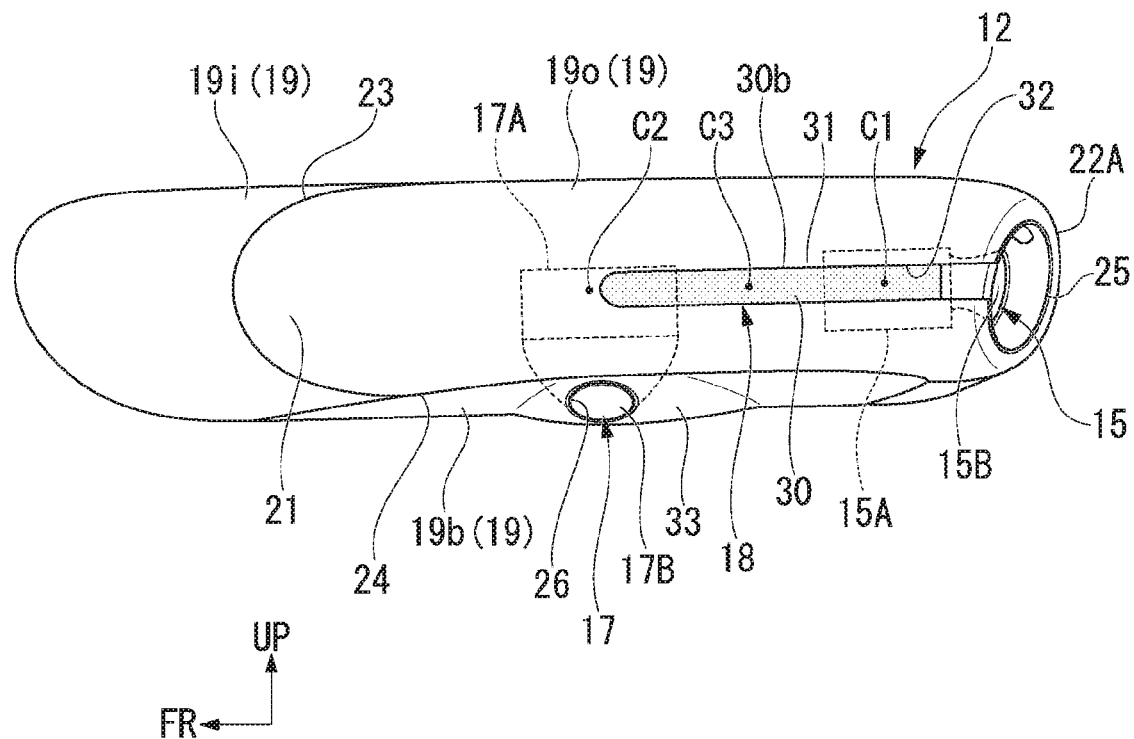
FIG. 10 is a side view of the imaging unit according to the first embodiment of the present invention.
Figure 11:
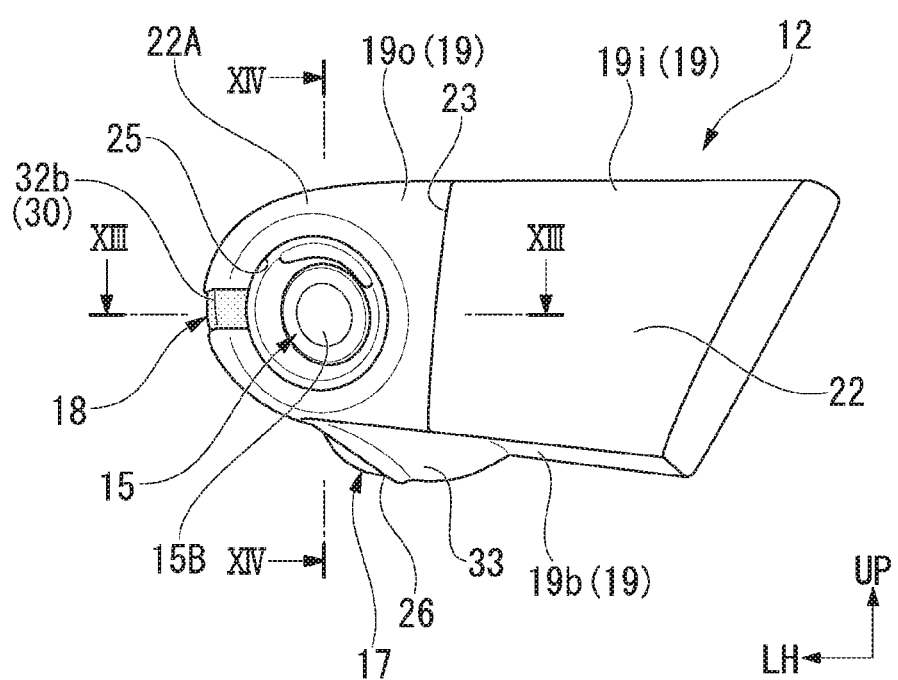
FIG. 11 is a rear view of the imaging unit according to the first embodiment of the present invention.

FIG. 7 is a top view of the imaging unit 12 that is provided on the left front side door 5. FIG. 8 is a bottom view of the imaging unit 12. FIG. 9 is a front view of the imaging unit 12. FIG. 10 is a side view of the imaging unit 12. FIG. 11 is a rear view of the imaging unit 12.

As shown in FIGS. 7 to 11, the imaging unit 12 includes the rearward imaging apparatus 15 that captures an image of a side rear direction of the vehicle, a downward imaging apparatus 17 that captures an image of a side lower direction of the vehicle, a lamp body unit 18 that constitutes a turn lamp, a width indicator, and the like, and a housing 19 that houses the rearward imaging apparatus 15, the downward imaging apparatus 17, and the lamp body unit 18. The housing 19 is attached to an outer surface of the front side door 5 close to a front part of the front side door 5 via a base member (not shown).

The housing 19 includes an inner housing 19*i* that is attached to an outer surface (side part of the vehicle body) of the front side door 5, an outer housing 19*o* that is assembled to an outer side in the vehicle width direction of the inner housing 19*i*, and a bottom housing 19*b* that is assembled to an opening 20 at bottom parts of the inner housing 19*i* and the outer housing 19*o*. The inner housing 19*i*, the outer housing 19*o*, and the bottom housing 19*b* are detachably assembled together by screw fastening, clip fastening, male and female fitting, or the like. The inner housing 19*i*, the outer housing 19*o*, and the bottom housing 19*b* are formed of, for example, a hard plastic material.

As shown in FIG. 7, the housing 19 is formed in a substantially trapezoidal shape in a top view in which a width of an outer side b on the outer side in the vehicle width direction is narrower than that of an inner side a on the inner side in the vehicle width direction that is attached to the front side door 5. A front end part of the inner side a and a front end part of the outer side b are connected by an inclined side c. The inclined side c is inclined outward in the vehicle width direction toward the rearward direction from the front end part of the inner side a. The inclined side c and the outer side b are connected by a smooth curve. In the outer surface of the housing 19, the inclined side c and a part that corresponds to the curved part which connects the inclined side c and the outer side b are referred to as an inclined region 21 of the housing 19. In the outer surface of the housing 19, a part that corresponds to a side d which connects together rear end parts of the inner side a and the outer side b is referred to as a rear end region 22 of the housing 19.

As shown in FIG. 7, a segmentation boundary part 23 between the inner housing 19*i* and the outer housing 19*o* is arranged on an upper surface side of the housing 19. The segmentation boundary part 23 on the upper surface side of the housing 19 extends straight substantially in the vehicle front-to-rear direction. The segmentation boundary part 23 on the upper surface side of the housing 19 is arranged at a position that is deviated outward in the vehicle width direction from a middle (center line c1 in FIG. 7) in the vehicle width direction of the housing 19. In the outer surface of the housing 19, the inner and outer sides in the vehicle width direction that interpose the segmentation boundary part 23 are set to a different color from each other. The outer surface of the inner housing 19*i* and the outer surface of the outer housing 19*o* are constituted of a smoothly continuous surface so as to interpose the segmentation boundary part 23.

The segmentation boundary part 23 between the inner housing 19*i* and the outer housing 19*o* extends toward a lower surface side across the front and rear end parts of the inner housing 19*i* and the outer housing 19*o*. As shown in FIG. 8, the opening 20 described above is formed on the lower surface of the outer housing 19*o* such that the opening 20 enters the outside in the vehicle width direction beyond the segmentation boundary part 23. A part of the opening 20 of the outer housing 19*o* that enters the outside in the vehicle width direction is a segmentation boundary part 24 between the bottom housing 19*b* and the outer housing 19*o*. The bottom housing 19*b* is detachably assembled to and across both lower walls of the inner housing 19*i* and the outer housing 19*o*.

The rearward imaging apparatus 15 includes an apparatus main body 15A that includes an image sensor and a variety of processing circuits and an imaging lens 15B that captures an image of an imaging target. The rearward imaging apparatus 15 is arranged at an outer portion in the vehicle width direction of a rear part in the housing 19. The imaging lens 15B is exposed to the outside of the vehicle body at the outer portion in the vehicle width direction of the rear end region 22 of the housing 19. A rearward inclined surface 22A that is directed to the side rear direction of the vehicle is provided on the outer portion in the vehicle width direction of the rear end region 22 of the housing 19 (outer housing 19o). A first lens exposure hole 25 (lens arrangement part) for exposing the imaging lens 15B to the outside is provided on the rearward inclined surface 22A. As shown in FIG. 7, an optical axis oa1 of the imaging lens 15B faces the vehicle rearward direction in a state of being slightly inclined outward in the vehicle width direction.

The downward imaging apparatus 17 is used for a blind monitor system or the like that displays the side lower direction of the vehicle, which becomes a blind spot from the driver seat, on a monitor (not shown) on the driver seat side. The downward imaging apparatus 17 includes an apparatus main body 17A that includes an image sensor and a variety of processing circuits and an imaging lens 17B that captures an image of an imaging target. The imaging lens 17B is exposed to the outside of the vehicle body at a lower surface in a middle region in the vehicle front-to-rear direction of the housing 19. A second lens exposure hole 26 for exposing the imaging lens 17B to the outside is provided on a lower surface of the bottom housing 19b. As shown in FIG. 9, an optical axis oa2 of the imaging lens 17B faces the vehicle downward direction in a state of being slightly inclined outward in the vehicle width direction.

As shown in FIG. 7, the rearward imaging apparatus 15 is arranged at a further rearward position of the vehicle than the downward imaging apparatus 17 when the housing 19 is seen from the above and is arranged inside the housing 19 such that an outer end in the vehicle width direction of the imaging lens 15B is arranged at an outer position in the vehicle width direction than the downward imaging apparatus 17. As shown in FIG. 10, the rearward imaging apparatus 15 and the downward imaging apparatus 17 are arranged inside the housing 19 such that a position of a center c1 of the apparatus main body 15A of the rearward imaging apparatus 15 and a position of a center c2 of the apparatus main body 17A of the downward imaging apparatus 17 are substantially horizontal in a state where the housing 19 is attached to a side part of the front side door 5.

As shown in FIG. 7, the lamp body unit 18 includes a base block 27 that is attached to an inner part of the housing 19, a circuit board 28 that is held by the base block 27, a lamb body 29 such as an LED that is mounted on the circuit board 28, and an elongated light guide body 30 that is held by the base block 27 and that guides light of the lamb body 29 to a predetermined region on the outer surface of the housing 19. The light guide body 30 includes an inclined part 30a that extends obliquely outward in the vehicle width direction from the base block 27 toward the vehicle body rearward direction and a light irradiation part 30b that extends linearly from a rear end portion of the inclined part 30a to the vehicle rearward direction.

Figure 12:
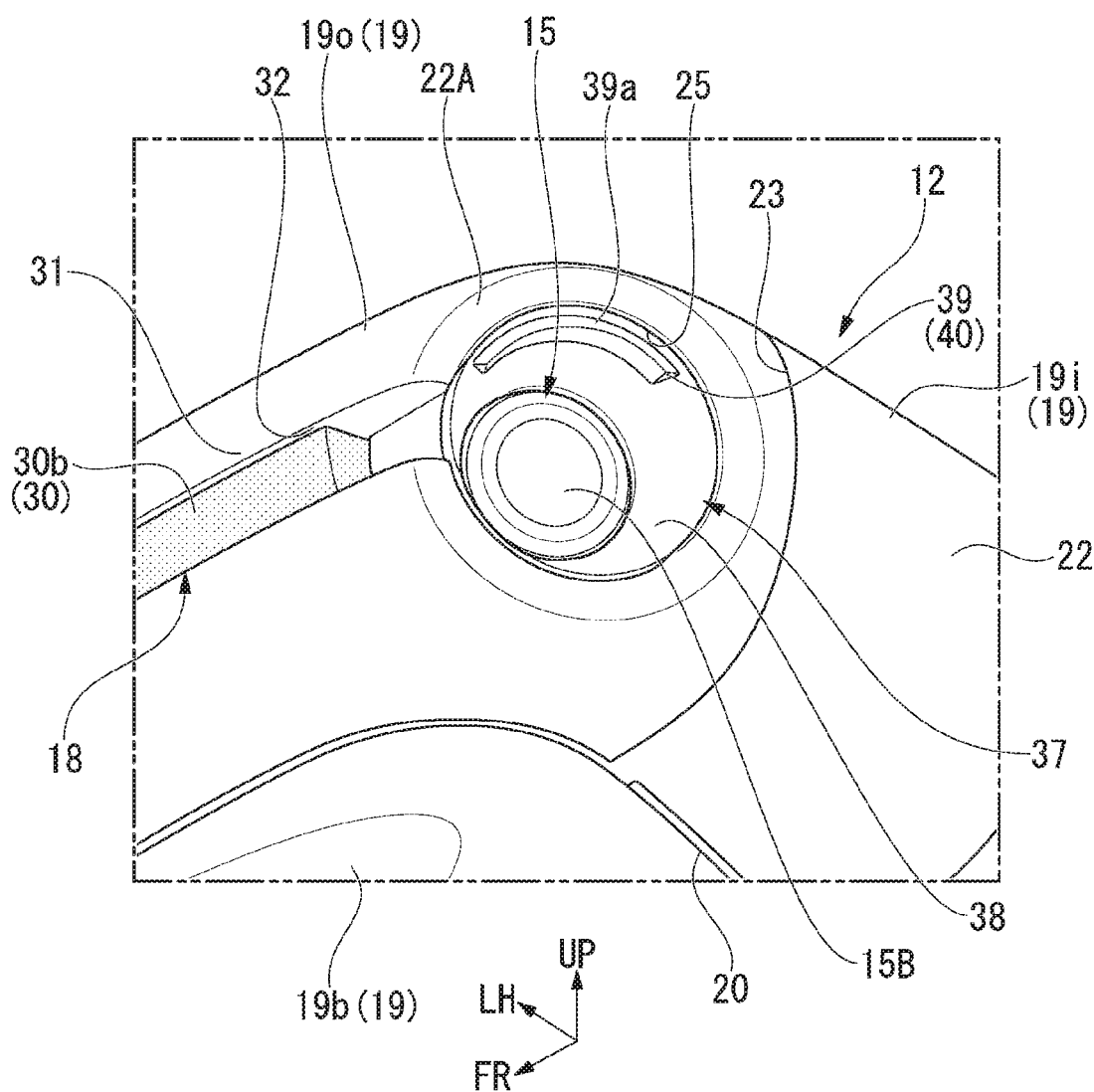
FIG. 12 is a perspective view of the imaging unit according to the first embodiment of the present invention.
Figure 13:
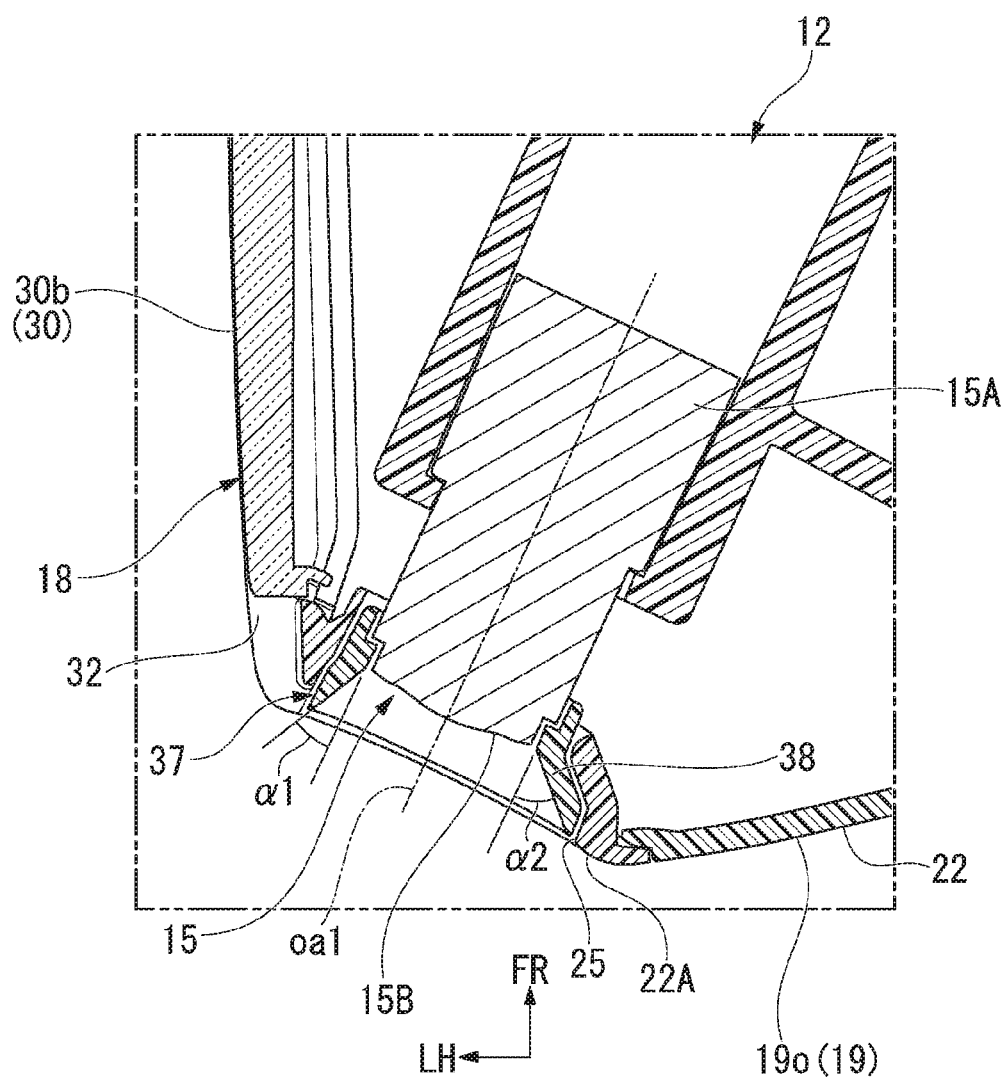
FIG. 13 is a cross-sectional view along a XIII-XIII line of FIG. 11 of the imaging unit according to the first embodiment of the present invention.

FIG. 12 is a view of the rear end region 22 of the imaging unit 12 seen from a lower direction on the outside in the vehicle width direction. FIG. 13 is view showing a cross-section along a XIII-XIII line of FIG. 11.

An outer side surface in the vehicle width direction of the housing 19 is formed of an arc surface that is curved in the vertical direction. On the outer side surface in the vehicle width direction, a groove 32 (notch part) having a substantially rectangular cross-section is formed substantially in the vehicle body front-to-rear direction at a position slightly lower than a maximum protrusion part 31 that protrudes outward in the vehicle width direction. The light irradiation part 30b of the light guide body 30 of the lamp body unit 18 is arranged on the groove 32 of the housing 19. A rear end portion of the light irradiation part 30b of the light guide body 30 is arranged in front of a position that faces the rearward inclined surface 22A in the groove 32 of the housing 19. That is, the light irradiation part 30b is not arranged in the vicinity of the rear end part of the groove 32 of the housing 19. Thereby, it is possible to prevent the light that is emitted from the light irradiation part 30b from being incident on the imaging lens 15B of the rearward imaging apparatus 15 in advance.

The rear end part of the groove 32 of the housing 19 may be closed by a member having no light transparency.

On the other hand, the inclined part 30a of the light guide body 30 of the lamp body unit 18, the base block 27, the circuit board 28, the lamb body 29, and the like are arranged inside the housing 19. The inclined part 30a of the light guide body 30 is arranged substantially along the inclined region 21 on the outer surface of the housing 19. Inside the housing 19, the downward imaging apparatus 17 is arranged at an inner portion in the vehicle width direction of the inclined part 30a of the light guide body 30. The imaging lens 17B of the downward imaging apparatus 17 is inclined obliquely downward from the apparatus main body 17A toward the outside in the vehicle width direction. A part of the imaging lens 17B that is inclined obliquely downward is arranged on the inner portion in the vehicle width direction of the inclined part 30a of the light guide body 30. As shown in FIG. 10, the lamp body unit 18 is arranged inside the housing 19 such that a center c3 in the vertical direction of the lamp body unit 18 is substantially horizontal to the position of the center c1 of the apparatus main body 15A of the rearward imaging apparatus 15 and the position of the center c2 of the apparatus main body 17A of the downward imaging apparatus 17 in a state where the housing 19 is attached to the side part of the front side door 5.

A protrusion part 33 that protrudes downward is provided in an outer region in the vehicle width direction of the bottom housing 19b. The protrusion part 33 is formed in a substantially spindle shape that is elongated in the vehicle front-to-rear direction. The second lens exposure hole 26 for exposing the imaging lens 17B of the downward imaging apparatus 17 to the downward direction of the bottom housing 19b is formed on the protrusion part 33. In the protrusion part 33, the second lens exposure hole 26 is arranged in a region wider than a width in the vehicle width direction of the second lens exposure hole 26, for example, in a region twice or more wider than the width in the vehicle width direction of the second lens exposure hole 26. The protrusion part 33 has a region A2 that extends toward a further rearward direction of the vehicle than the second lens exposure hole 26 (imaging lens 17B).

The imaging lens 17B of the downward imaging apparatus 17 is arranged such that an outer surface of the imaging lens 17B is substantially continuous with a surface shape of the protrusion part 33 of the bottom housing 19b. As shown in FIG. 8, the protrusion part 33 is arranged at a position that overlaps with part of the imaging lens 15B of the rearward imaging apparatus 15 in the vehicle width direction. A reference numeral A3 in FIG. 8 represents a width in the vehicle width direction of the protrusion part 33, and a reference numeral a3 represents a width in the vehicle width direction of the imaging lens 15B.

As shown in FIG. 8, the protrusion part 33 that is formed in the substantially spindle shape protrudes frontward such that a further front portion than the second lens exposure hole 26 draws an elliptical curve in a bottom view of the housing 19. The protrusion boundary portion close to the vehicle body of the front portion of the protrusion part 33 is a region al of which a separation width with respect to the side surface of the vehicle body becomes narrower toward the further rearward direction of the vehicle.

Figure 14:
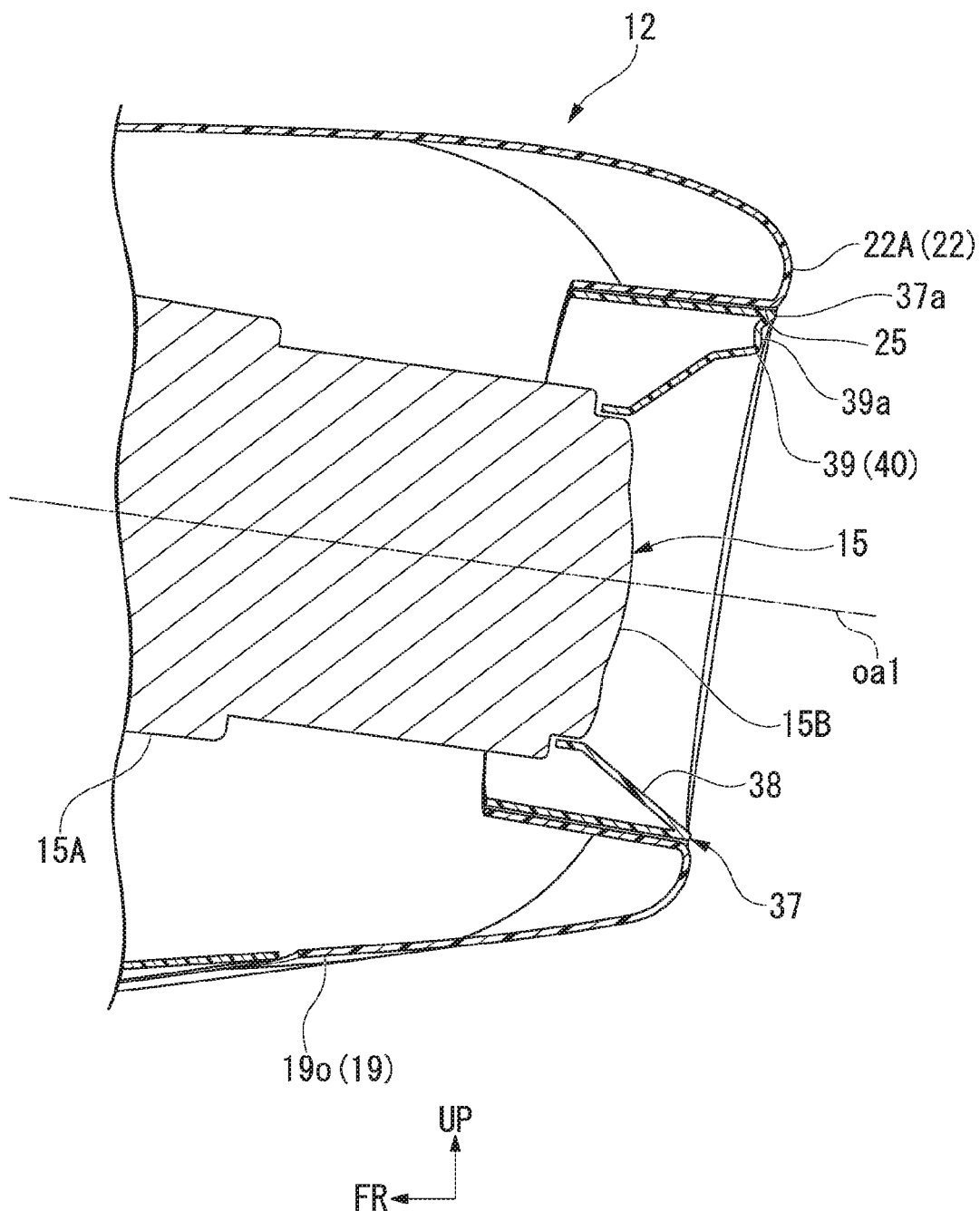
FIG. 14 is a cross-sectional view along a XIV-XIV line of FIG. 11 of the imaging unit according to the first embodiment of the present invention.

FIG. 14 is a view showing a cross-section along a XIV-XIV line of FIG. 11.

As shown in FIG. 12 to FIG. 14, a lens hood 37 that covers a circumferential area of the imaging lens 15B of the rearward imaging apparatus 15 is attached to the first lens exposure hole 25 on a rear end of the housing 19 (outer housing 19o). The lens hood 37 has a hood wall 38 that has a truncated conical shape and that extends obliquely outward in a radial direction from the circumferential area of the imaging lens 15B toward the imaging direction. An inclination angle of the hood wall 38 relative to the optical axis oa1 of the imaging lens 15B is differently set between an outer area having the groove 32 (notch part) of the housing 19 and an inner area on a side opposite to the outer area, the outer area and the inner area interposing the optical axis oa1.

Specifically, as shown in FIG. 13, an inclination angle α1 of the outer area is set to be equal to or more than a field angle of the imaging lens 15B and to be smaller than an inclination angle α2 of the inner area. In a circumferential direction of the hood wall 38, an angular difference between the inclination angle α1 of the inner area and the inclination angle α2 of the outer area is the largest, and the inclination angle changes continuously between the inner area and the outer area. The inclination angle of the hood wall 38 relative to the optical axis oa1 is set such that widths in the radial direction of the outer area and the inner area of the hood wall 38 are viewed to be the same width when the housing 19 is seen from the rearward direction.

As shown in FIG. 12 and FIG. 14, when seen from a direction of the optical axis oa1 of the imaging lens 15B, in the hood wall 38 of the lens hood 37, a step part 39 having a substantially vertical surface 39a that is directed in the imaging direction is formed in an upper region of the imaging lens 15B. The step part 39 is formed of a protrusion 40 that protrudes in the imaging direction with respect to an inclined surface of the hood wall 38. The protrusion 40 is formed in an arc shape substantially along an outer circumferential edge part of the hood wall 38 when seen from the direction of the optical axis oa1.

The protrusion 40 can also be formed in an annular shape when seen from the direction of the optical axis oa1.

The protrusion 40 (step part 39) is formed to be recessed further frontward than an outer circumferential end part 37a (end part in an imaging target direction) of the lens hood 37.

The imaging unit 12 of the present embodiment is arranged at a height equal to or lower than that of the side part of the vehicle 1.

Hereinafter, this will be described with reference to FIG. 2. FIG. 2 shows a door waist part 36 and a character line 35 on a vehicle body side part. The character line 35 is a convex ridge line part that is provided to protrude on the outer surface of the vehicle body side part that includes the front side door 5. The character line 35 extends substantially in the vehicle front-to-rear direction. The door waist part 36 is an upper side part of a door main body of the front side door 5 and constitutes a seeming lower side of a window frame part in which the door glass 6 moves upward and downward.

The imaging unit 12 is arranged above a height h1 of the character line 35 of the front side door 5 and in a height range from 925 mm from a ground surface to a maximum vehicle height h2. Therefore, as shown in FIG. 2, sprays s that is scattered by a front wheel Wf of the vehicle when the vehicle travels are blocked by a raised part of the character line 35 and hardly adhere to the imaging unit 12.

In the case of the present embodiment, since an arrangement height of the imaging unit 12 is set to 925 mm or more from the ground surface, halation due to light of a headlight of a following vehicle is less likely to occur. That is, in the present embodiment, since the imaging unit 12 is arranged at the height of 950 mm which is a maximum arrangement height of a headlight of a general vehicle that is used on a public road and at the height of 925 mm or more in consideration of a downward inclination of an optical axis of the headlight, it is possible to prevent the light of the headlight of the following vehicle from being directly incident on the rearward imaging apparatus 15 and prevent occurrence of halation in the image of the monitor 11.

In the case of the present embodiment, the imaging unit 12 is arranged at a lower position than the door waist part 36 of the front side door 5. Therefore, it becomes difficult for the imaging unit 12 to enter the driver's view through the window frame part of the front side door 5.

As shown in FIG. 2, a retractable flash door handle 45 is provided on a rear edge part of the outer surface of the front side door 5. The flash door handle 45 is formed in a horizontally elongated rectangular shape in a side view of the vehicle. The imaging unit 12 that is attached to a front edge part of the outer surface of the front side door 5 is formed in a horizontally elongated rectangular shape having the same size and substantially the same shape as those of the flash door handle 45 in a side view of the vehicle. The imaging unit 12 and the flash door handle 45 are arranged at point-symmetrical positions with respect to a centering point on the character line 35 in a side view of the vehicle.

Figure 15:
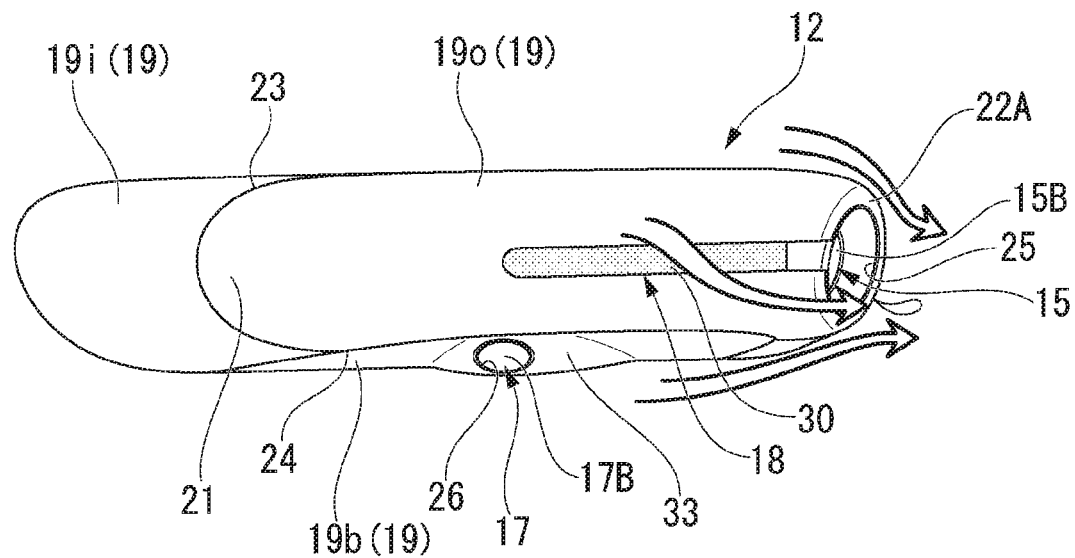
FIG. 15 is a side view of the imaging unit according to the first embodiment of the present invention.
Figure 16:
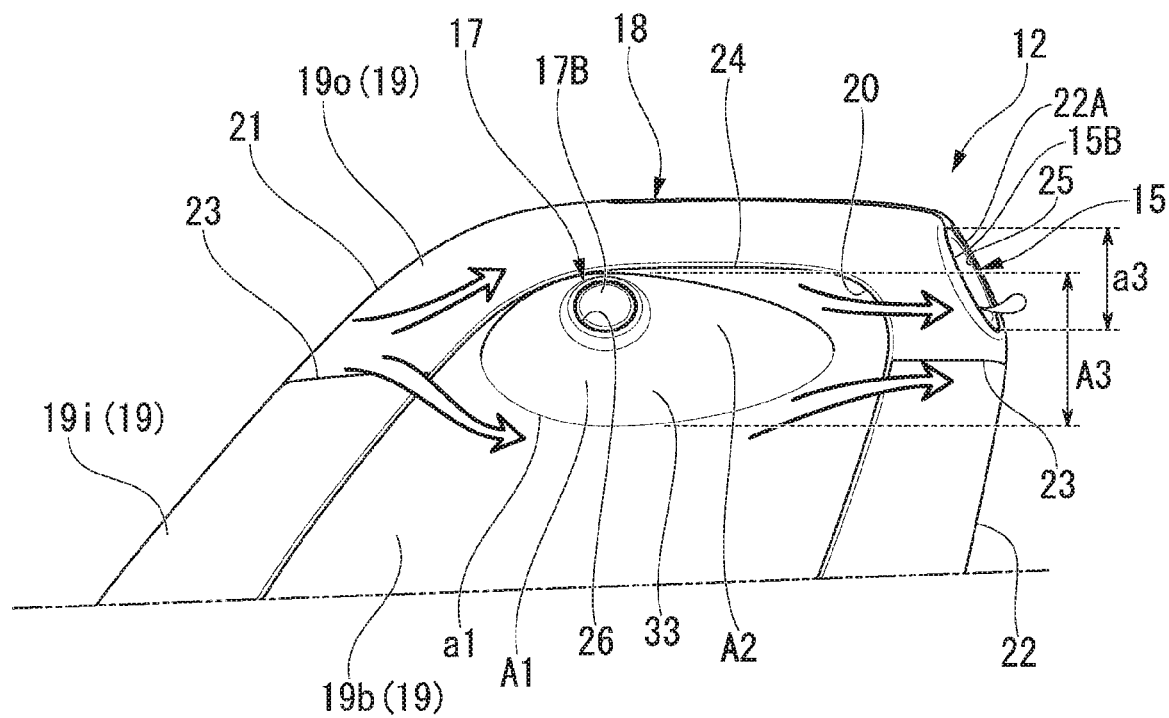
FIG. 16 is a bottom view of the imaging unit according to the first embodiment of the present invention.

FIG. 15 is a side view of the imaging unit 12 in which a flow of travel wind is shown by an arrow when the vehicle travels (when the vehicle travels frontward). FIG. 16 is a bottom view of the imaging unit 12 in which the flow of travel wind is shown by an arrow similarly.

When the vehicle 1 travels frontward, the travel wind hits on a front surface of the housing 19 of the imaging unit 12, and the travel wind is separated into a flow that flows along an upper surface of the housing 19 and a flow that flows along a lower surface of the housing 19. The travel wind that flows along the upper surface of the housing 19 flows to the vehicle body rearward direction while changing the direction, at the rear end part of the housing 19, toward the middle direction in the vertical direction of the housing 19.

On the other hand, as shown in FIG. 16, the flow of the travel wind that flows along the lower surface of the housing 19 hits on the protrusion part 33 on the lower surface of the housing 19 and is separated to right and left, and then, the separated flows merge in the vicinity of the rear end part of the housing 19 in the rearward direction of the protrusion part 33. At this time, since the protrusion part 33 is formed in the substantially spindle shape that is elongated in the front-to-rear direction, the flow of the travel wind at the merging part is smoothed. Then, the travel wind that passes through the protrusion part 33 flows to the vehicle body rearward direction while changing the direction, at the rear end part of the housing 19, toward the middle direction in the vertical direction of the housing 19. At this time, the flow rate of the travel wind that passes through the lower surface of the housing 19 and that flows to the vehicle body rearward direction from the rear end part of the housing 19 is substantially the same as the flow rate of the travel wind that passes through the upper surface of the housing 19 and that flows to the vehicle body rearward direction from the rear end part of the housing 19 and is not at least extremely slower than the flow rate on the upper surface side. That is, the flow rate of the travel wind that passes through the lower surface side of the housing 19 does not stagnate in the vicinity of the rear end part of the housing 19.

Therefore, at the time of the vehicle 1 traveling frontward, even when water droplet such as rain may flow into the vicinity below the imaging lens 15B of the rearward imaging apparatus 15 at the rear part of the housing 19, the water droplet is blown to the vehicle body rearward direction by the travel wind that smoothly flows rearward along the lower surface of the housing 19. Accordingly, at the time of the vehicle traveling frontward, the water droplet (water flow) hardly flows to the imaging lens 15B at the rear part of the housing 19.

As described above, in the imaging unit 12 of the present embodiment, the protrusion part 33 that extends substantially in the vehicle front-to-rear direction is provided on the lower surface of the housing 19. Therefore, when the vehicle travels frontward, it is possible to adjust the flow of the travel wind that flows to the lower surface of the housing 19 by the protrusion part 33 and to smoothly blow the water droplet that flows into the vicinity below the imaging lens 15B of the rearward imaging apparatus 15 to the vehicle rearward direction. Accordingly, when the imaging unit 12 of the present embodiment is employed, it is possible to prevent the water droplet such as rain from coming around to the imaging lens 15B part when the vehicle travels.

Specifically, in the imaging unit 12 of the present embodiment, the region a1 of which the separation width with respect to the side surface of the vehicle body becomes narrower toward the further rearward direction of the vehicle is provided on the protrusion part 33 that is formed on the lower surface of the housing 19. Therefore, at the time of the vehicle traveling frontward, in the region a1 in which the separation width between the vehicle body side surface and the protrusion part 33 becomes narrower, the speed of the travel wind is increased. Thereby, the flow rate of the travel wind that passes between the vehicle body side surface and the protrusion part 33 becomes faster than the flow rate of the travel wind that passes at the outer side in the vehicle width direction of the protrusion part 33, and the travel wind that passes at the outer side in the vehicle width direction is attracted by the flow of the travel wind at the inner side in the vehicle width direction having a fast flow rate. Accordingly, the water droplet that flows into the vicinity below the imaging lens 15B is suctioned by the flow of the travel wind at the inner side in the vehicle width direction of the protrusion part 33 having a fast flow rate and is blown to the vehicle body rearward direction at the inner position in the vehicle width direction of the imaging lens 15B. Accordingly, when the configuration of the present embodiment is employed, it is possible to further prevent the water droplet such as rain from coming around to the imaging lens 15B part at the time of traveling.

Further, in the imaging unit 12 of the present embodiment, the imaging lens 17B of the downward imaging apparatus 17 penetrates through the lower surface of the housing 19 and is arranged on the protrusion part 33. Therefore, by using the imaging lens 17B of the downward imaging apparatus 17, it is possible to adjust the flow of the travel wind on the lower surface side of the housing 19.

Further, in the imaging unit 12 of the present embodiment, the region A2 that extends in the vehicle rearward direction further than the imaging lens 17B is provided on the protrusion part 33. Therefore, the imaging lens 17B becomes less noticeable externally, and the design property of the external appearance is enhanced.

Further, in the case of the imaging unit 12 of the present embodiment, the protrusion part 33 is formed in a substantially spindle shape that is elongated in the vehicle front-to-rear direction. Therefore, at the lower surface of the housing 19, it is possible to allow the travel wind to flow further smoothly toward the vehicle rearward direction by the protrusion part 33 having the substantially spindle shape. Further, in the case where this configuration is employed, since the protrusion part 33 becomes less noticeable when seen externally, the design property of the external appearance is also enhanced.

Further, in the imaging unit 12 of the present embodiment, the imaging lens 17B is arranged in the region A1 of the protrusion part 33 having a wider width than that in the vehicle width direction of the imaging lens 17B. Therefore, the imaging lens 17B allows the flow of the travel wind at the lower surface of the housing 19 to hardly stagnate. Accordingly, even in a structure in which the imaging lens 17B of the downward imaging apparatus 17 is arranged on the lower surface of the housing 19, it is possible to smoothly blow the water droplet that flows into the vicinity below the imaging lens 15B of the rearward imaging apparatus 15 to the vehicle body rearward direction.

Specifically, in the imaging unit 12 of the present embodiment, the imaging lens 17B is arranged such that the surface shape of the imaging lens 17B substantially continues to the surface shape of the protrusion part 33. Therefore, the surface shape of the imaging lens 17B constitutes part of the substantially spindle shape of the protrusion part 33. Accordingly, in a case where this configuration is employed, even in a structure in which the imaging lens 17B of the downward imaging apparatus 17 is arranged on the lower surface of the housing 19, it is possible to smoothly blow the water droplet that flows into the vicinity below the imaging lens 15B of the rearward imaging apparatus 15 to the vehicle body rearward direction.

Further, in the imaging unit 12 of the present embodiment, the protrusion part 33 is arranged in a region that overlaps with part of the imaging lens 15B of the rearward imaging apparatus 15 in the vehicle width direction. Therefore, part of the imaging lens 15B is arranged in the region in which the travel wind passes through the protrusion part 33 and smoothly flows to the vehicle rearward direction when the vehicle travels. Accordingly, in a case where the imaging unit 12 of the present embodiment is employed, it is possible to smoothly blow the water droplet that flows into the vicinity below the imaging lens 15B to the vehicle body rearward direction.

Second Embodiment

Figure 17:
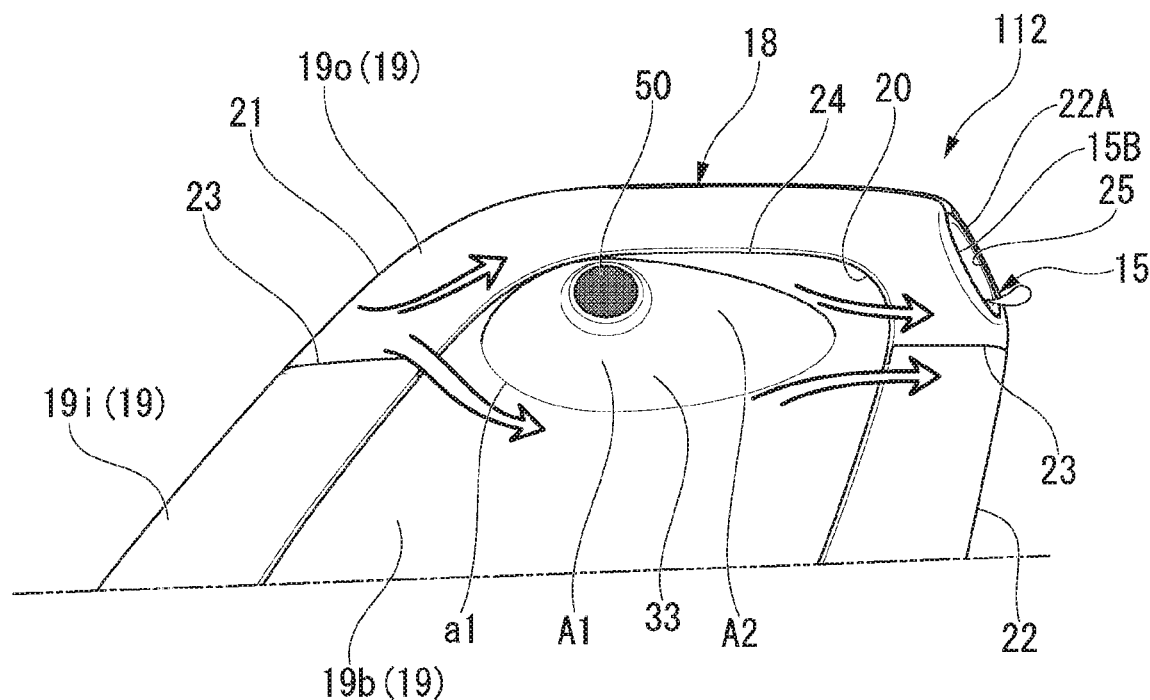
FIG. 17 is a bottom view of an imaging unit according to a second embodiment of the present invention.

FIG. 17 is a bottom view of an imaging unit 112 of a second embodiment in which a flow of travel wind is shown by an arrow when the vehicle travels (when the vehicle travels frontward).

The imaging unit 112 of the present embodiment is different from the imaging unit 12 of the first embodiment and does not include the downward imaging apparatus 17 that is configured to capture an image of a side lower direction of the vehicle. Other configurations are substantially the same as those of the first embodiment. However, since the imaging unit 112 does not include the downward imaging apparatus 17, the imaging lens 17B (refer to FIG. 16) is not exposed at the lower surface of the housing 19 (bottom housing 19b).

Similarly to the imaging unit 12 of the first embodiment, a protrusion part 33 having a substantially spindle shape that is elongated in the vehicle front-to-rear direction is formed on a lower surface in an outer region in the vehicle width direction of the bottom housing 19b. A simulated lens portion 50 having substantially the same shape as the outer surface of the imaging lens 17B is formed on a part of the outer surface of the protrusion part 33 where the imaging lens 17B of the first embodiment is arranged.

The imaging unit 112 of the present embodiment includes a housing 19 having a shape that is substantially the same as that of the first embodiment. Therefore, when the vehicle travels frontward, it is possible to smoothly blow the water droplet that flows into a region below the downward imaging apparatus 15 to the vehicle body rearward direction by the action of the travel wind that flows along the protrusion part 33 on the lower surface of the housing 19.

In the imaging unit 112 of the present embodiment, the flow of the travel wind when the vehicle travels frontward is substantially similar to that of the imaging unit 12 of the first embodiment which includes the downward imaging apparatus 17. Therefore, when producing the imaging unit 12 which includes the downward imaging apparatus 17 and the imaging unit 112 which does not include the downward imaging apparatus 17, the design of the housing 19 in consideration of the adjustment of the flow of the travel wind becomes easy. However, it is not indispensable to provide the simulated lens 50 on the protrusion part 33, and a protrusion part 33 having a substantially spindle shape and not having the simulated lens 50 may be formed on the lower surface of the bottom housing 19b.

Third Embodiment

Figure 18:
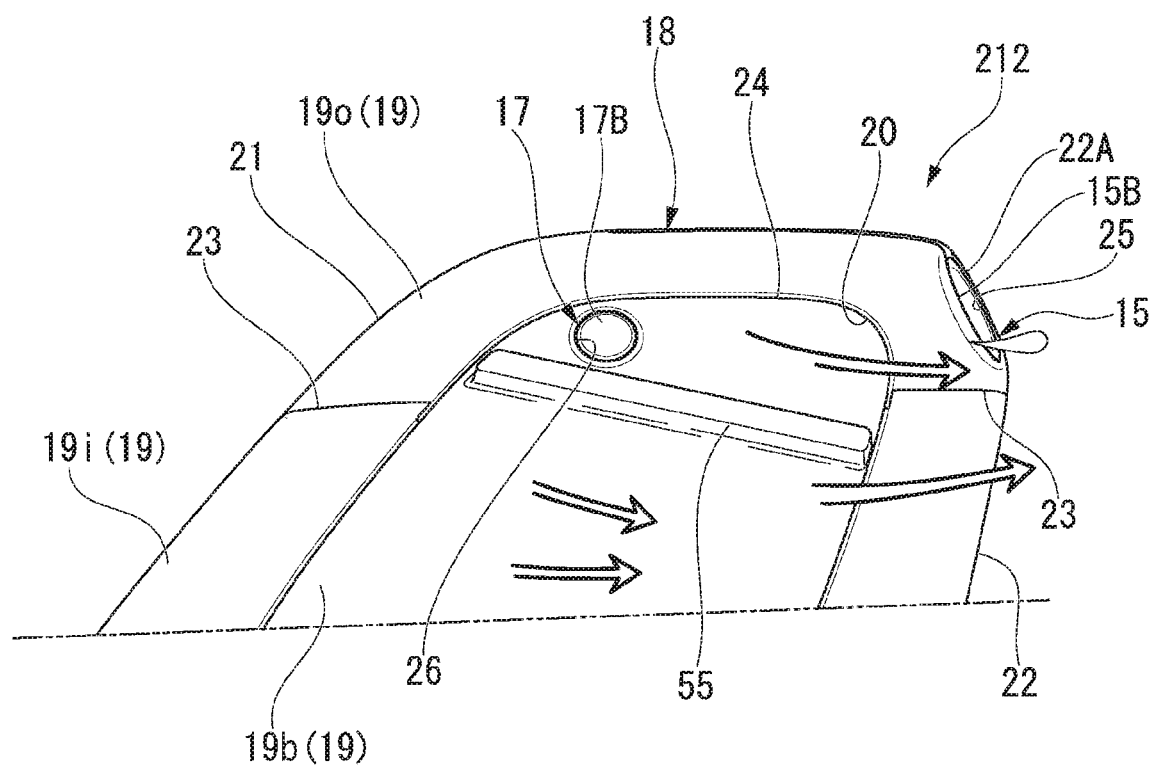
FIG. 18 is a bottom view of an imaging unit according to a third embodiment of the present invention.

FIG. 18 is a bottom view of an imaging unit 212 of a third embodiment in which a flow of travel wind is shown by an arrow when the vehicle travels (when the vehicle travels frontward).

In the imaging unit 212 of the present embodiment, only the shape of the bottom housing 19b is different from that of the imaging unit 12 of the first embodiment. Although the protrusion part 33 having a substantially spindle shape that is elongated in the front-to-rear direction is formed on the bottom housing 19b of the first embodiment, a protrusion part 55 that extends straight at a substantially constant width is formed on the bottom housing 19b of the present embodiment. The protrusion part 55 extends from a front end position close to the outside in the vehicle width direction of the lower surface of the bottom housing 19b toward a rear end position obliquely such that a separation width with respect to the side surface of the vehicle body is gradually narrower toward the further rearward direction of the vehicle. The imaging lens 17B of the downward imaging apparatus 17 is arranged in an outer region in the vehicle width direction close to a front portion of the protrusion part 55.

In the present embodiment, the substantially entire region in the longitudinal direction of the protrusion part 55 is the region in which the separation width with respect to the side surface of the vehicle body is narrower toward the further rearward direction of the vehicle.

In the imaging unit 212 of the present embodiment, although the protrusion part 55 that is formed on the lower surface of the housing 19 does not have a substantially spindle shape, since the entire protrusion part 55 extends such that the separation width with respect to the side surface of the vehicle body is narrower toward the further rearward direction of the vehicle, it is possible to obtain a flow adjustment action as described below when the vehicle travels frontward.

That is, at the time of the vehicle traveling frontward, when travel wind flows into the lower surface side of the housing 19, the travel wind is separated to right and left at the front end side of the protrusion part 55 to be a flow that flows at the inside in the vehicle width direction of the protrusion part 55 along the extension direction of the protrusion part 55 and a flow that flows at the outside in the vehicle width direction of the protrusion part 55. At this time, since the separation width between the side surface of the vehicle body and the protrusion part 55 is gradually narrower toward the further rearward direction of the vehicle, the flow rate of the flow of the travel wind that flows at the inside in the vehicle width direction of the protrusion part 55 when passing through the rear end of the protrusion part 55 is increased.

Then, the travel wind that passes through the inside in the vehicle width direction of the protrusion part 55 and the travel wind that passes through the outside in the vehicle width direction of the protrusion part 55 merge in the vicinity of the rear end of the housing 19 and flow toward the vehicle rearward direction. At this time, since the speed of part of the travel wind is increased when passing through the inside in the vehicle width direction of the protrusion part 55, the travel wind passes through the lower surface of the rear end part of the housing 19 at a sufficient flow rate while attracting the travel wind that passes through the outside in the vehicle width direction of the protrusion part 55 to the vehicle body.

Accordingly, in the imaging unit 212 of the present embodiment, when the vehicle travels, it is possible to smoothly blow the water droplet that flows into the vicinity below the imaging lens 15B of the rearward imaging apparatus 15 to the vehicle rearward direction, at the inner position in the vehicle width direction of the imaging lens 15B. Therefore, in the case of the imaging unit 212 of the present embodiment, it is also possible to prevent the water droplet such as rain from coming around to the imaging lens 15B part.

Fourth Embodiment

Figure 19:
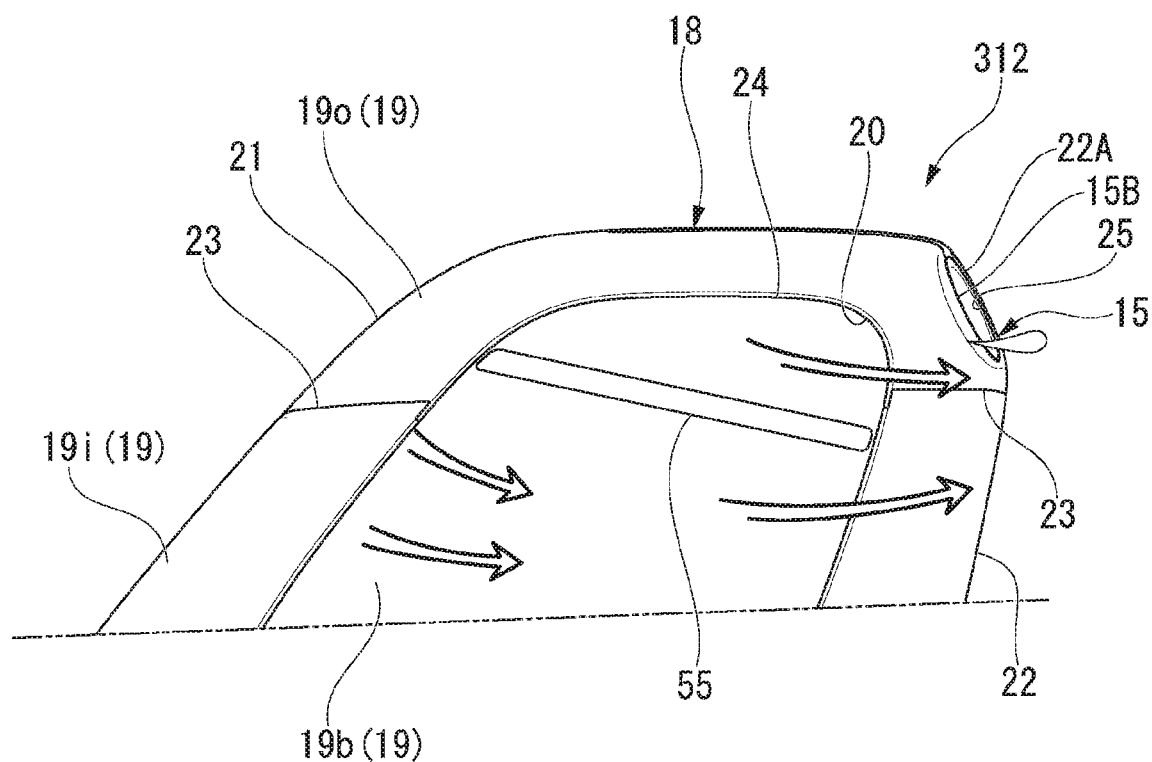
FIG. 19 is a bottom view of an imaging unit according to a fourth embodiment of the present invention.

FIG. 19 is a bottom view of an imaging unit 312 of a fourth embodiment in which a flow of travel wind is shown by an arrow when the vehicle travels (when the vehicle travels frontward).

The imaging unit 312 of the present embodiment has a configuration substantially similar to that of the imaging unit 212 of the third embodiment but does not include the downward imaging apparatus 17 that captures an image of a side lower direction of the vehicle. Therefore, the imaging lens 17B is not arranged on the lower surface of the housing 19 (bottom housing 19b).

In the imaging unit 312 of the present embodiment, although the imaging lens 17B is not arranged on the lower surface of the housing 19, the protrusion part 55 similar to that of the third embodiment is formed on the lower surface of the housing 19. Therefore, when the vehicle travels frontward, it is possible to obtain a flow adjustment effect similar to that of the third embodiment. Accordingly, in the case of the present embodiment, it is also possible to smoothly blow the water droplet that flows into the vicinity below the imaging lens 15B of the rearward imaging apparatus 15 to the vehicle rearward direction, at the inner position in the vehicle width direction of the imaging lens 15B.

The present invention is not limited to the embodiments described above, and a variety of design changes can be made without departing from the scope of the invention.

What is claimed is:

1. A vehicle imaging unit comprising:
a rearward imaging apparatus that is configured to capture an image of a side rear direction of a vehicle; and
a housing that houses the rearward imaging apparatus and that is attached to a side part of a vehicle body, wherein
a first imaging lens of the rearward imaging apparatus is arranged on a rear end part of the housing,
a protrusion part that extends substantially in a vehicle front-to-rear direction is provided on a lower surface of the housing,
the housing further houses a downward imaging apparatus that is configured to capture an image of a side lower direction of the vehicle,
a second imaging lens of the downward imaging apparatus penetrates through a lower surface in a middle region in the vehicle front-to-rear direction of the housing and is arranged on the protrusion part,
the protrusion part has a region that extends in a vehicle rearward direction further than the second imaging lens of the downward imaging apparatus,
a leading edge of the protrusion part is distant from a leading edge of the housing by a same amount as a trailing edge of the protrusion part is distant from a trailing edge of the housing,
the protrusion part includes a narrowing region of which a separation width with respect to a side surface of the vehicle body becomes narrower in the vehicle rearward direction such that, at a time of the vehicle traveling frontward, a flow rate of a first travel wind passing between the side surface of the vehicle body and the protrusion part becomes faster than a flow rate of a second travel wind passing at an outer side in a vehicle width direction of the protrusion part and the second travel wind is attracted by the first travel wind, and
the first imaging lens of the rearward imaging apparatus is exposed toward the rearward direction of the vehicle at the outer side in the vehicle width direction of the protrusion part and at a rear side of the vehicle from the narrowing region.

2. The vehicle imaging unit according to claim 1, wherein the protrusion part has a region of which a separation width with respect to a side surface of the vehicle body becomes narrower in a further rearward direction of the vehicle.

3. The vehicle imaging unit according to claim 1, wherein the protrusion part is formed in a substantially spindle shape that is elongated in the vehicle front-to-rear direction.

4. The vehicle imaging unit according to claim 1, wherein the protrusion part is formed in a substantially spindle shape that is elongated in the vehicle front-to-rear direction, and
the second imaging lens of the downward imaging apparatus is arranged in a region of the protrusion part having a wider width than that in a vehicle width direction of the second imaging lens.

5. The vehicle imaging unit according to claim 1, wherein the second imaging lens of the downward imaging apparatus is arranged such that a surface shape of the second imaging lens substantially continues to a surface shape of the protrusion part.

6. The vehicle imaging unit according to claim 1, wherein the protrusion part is arranged in a region that overlaps with part of the first imaging lens of the rearward imaging apparatus in a vehicle width direction.

7. The vehicle imaging unit according to claim 1, wherein a dummy lens having substantially a same shape as that in a case in which the second imaging lens of the downward imaging apparatus is arranged on the protrusion part is formed on the protrusion part, and the downward imaging apparatus is not provided.

8. A vehicle imaging unit comprising:
a rearward imaging apparatus that is configured to capture an image of a side rear direction of a vehicle; and
a housing that houses the rearward imaging apparatus and that is attached to a side part of a vehicle body, wherein
a first imaging lens of the rearward imaging apparatus is arranged on a rear end part of the housing,
a protrusion part that extends substantially in a vehicle front-to-rear direction is provided on a lower surface of the housing,
the housing further houses a downward imaging apparatus that is configured to capture an image of a side lower direction of the vehicle,
a second image lens of the downward imaging apparatus penetrates through a lower surface in a middle region in the vehicle front-to-rear direction of the housing and is arranged on the protrusion part,
the housing includes an opening in a middle region in the vehicle front-to-rear direction of a bottom surface of the housing,
the protrusion part is formed on a bottom surface housing covering the opening,
the protrusion part includes a narrowing region of which a separation width with respect to a side surface of the vehicle body becomes narrower in a vehicle rearward direction such that, at a time of the vehicle traveling frontward, a flow rate of a first travel wind passing between the side surface of the vehicle body and the protrusion part becomes faster than a flow rate of a second travel wind passing at an outer side in a vehicle width direction of the protrusion part and the second travel wind is attracted by the first travel wind, and
the first imaging lens of the rearward imaging apparatus is exposed toward the vehicle rearward direction at the outer side in the vehicle width direction of the protrusion part and at a rear side of the vehicle from the narrowing region.

9. The vehicle imaging unit according to claim 8, wherein the protrusion part is formed in a substantially spindle shape that is elongated in the vehicle front-to-rear direction, and
the protrusion part has a region of which a separation width with respect to a side surface of the vehicle body becomes narrower in a further rearward direction of the vehicle.

10. The vehicle imaging unit according to claim 8, wherein the protrusion part is arranged in a region that overlaps with part of the first imaging lens of the rearward imaging apparatus in a vehicle width direction.

11. The vehicle imaging unit according to claim 8, wherein the second image lens is arranged in an inner position in the vehicle width direction than the first image lens.

12. The vehicle imaging unit according to claim 8,
wherein the protrusion part includes a front side region and a rear side region,
the front side region extending frontward from the second image lens and the rear side region extending rearward from the second image lens, and
the rear side region is longer than the front side region in the vehicle front-to-rear direction.

13. The vehicle imaging unit according to claim 8,
wherein the second lens is arranged lower than the first lens in a vertical direction of the housing.

14. The vehicle imaging unit according to claim 8,
wherein the second image lens is arranged at part of the protrusion part facing outward in the vehicle width direction.

15. The vehicle imaging unit according to claim 8,
wherein a dummy lens having substantially a same shape as that in a case in which the second image lens of the downward imaging apparatus is arranged on the protrusion part is formed on the protrusion part, and the downward imaging apparatus is not provided.

16. The vehicle imaging unit according to claim 1,
wherein the protrusion part is formed in a substantially spindle shape that is elongated in the vehicle front-to-rear direction such that, at a time of the vehicle traveling frontward, a flow rate of a third travel wind flowing along the lower surface of the housing and separating to right and left after hitting the protrusion part and merging in a vicinity of a rear end part of the housing in the vehicle rearward direction from the protrusion part and flowing to the vehicle rearward direction from the rear end part of the housing is substantially equal to a flow rate of a fourth travel wind passing through an upper surface of the housing and flowing to the vehicle rearward direction from the rear end part of the housing.

17. The vehicle imaging unit according to claim 1,
wherein an outer side surface in the vehicle width direction of the housing is formed of an arc surface that is curved in a vertical direction of the housing,
a groove is formed substantially in the vehicle front-to-rear direction at a position lower than a maximum protrusion part of the arc surface that protrudes outward in the vehicle width direction,
a light irradiation part of a light guide body of a lamp body unit is arranged on the groove, and
the groove faces a rearward inclined surface provided at the vehicle rearward direction from the first imaging lens of the rearward imaging apparatus.

18. The vehicle imaging unit according to claim 1, wherein
a hood wall that has a truncated conical shape and that extends obliquely outward from the imaging direction of the first imaging lens of the rearward imaging apparatus and that covers a circumferential area of a rear end of the first imaging lens, and
an inclination angle of the hood wall relative to an optical axis of the first imaging lens is set such that the inclination angle thereof at an outer side in the vehicle width direction from the optical axis is smaller than the inclination angle thereof at an inner side in the vehicle width direction from the optical axis when the housing is seen in a cross-section which is substantially parallel with the vehicle width direction.

19. The vehicle imaging unit according to claim 8,
wherein the protrusion part is formed in a substantially spindle shape that is elongated in the vehicle front-to-rear direction such that, at a time of the vehicle traveling frontward, a flow rate of a third travel wind flowing along the lower surface of the housing and separating to right and left after hitting the protrusion part and merging in a vicinity of a rear end part of the housing in the vehicle rearward direction from the protrusion part and flowing to the vehicle rearward direction from the rear end part of the housing is substantially same as a flow rate of a fourth travel wind passing through an upper surface of the housing and flowing to the vehicle rearward direction from the rear end part of the housing.

20. The vehicle imaging unit according to claim 8,
wherein an outer side surface in the vehicle width direction of the housing is formed of an arc surface that is curved in a vertical direction of the housing,
a groove is formed substantially in the vehicle front-to-rear direction at a position lower than a maximum protrusion part of the arc surface that protrudes outward in the vehicle width direction,
a light irradiation part of a light guide body of a lamp body unit is arranged on the groove, and
the groove faces a rearward inclined surface provided at the vehicle rearward direction from the first imaging lens of the rearward imaging apparatus.

21. The vehicle imaging unit according to claim 8, wherein
a hood wall that has a truncated conical shape and that extends obliquely outward from the imaging direction of the first imaging lens of the rearward imaging apparatus and that covers a circumferential area of a rear end of the first imaging lens, and
an inclination angle of the hood wall relative to an optical axis of the first imaging lens is set such that the inclination angle thereof at an outer side in the vehicle width direction from the optical axis is smaller than the inclination angle thereof at an inner side in the vehicle width direction from the optical axis when the housing is seen in a cross-section which is substantially parallel with the vehicle width direction.

* * * * *